(12) United States Patent
He

(10) Patent No.: US 7,454,484 B1
(45) Date of Patent: Nov. 18, 2008

(54) METHOD AND APPARATUS FOR PRODUCING A MULTICAST TREE

(75) Inventor: Haixiang He, Woburn, MA (US)

(73) Assignee: Nortel Networks Limited (CA)

( * ) Notice: Subject to any disclaimer, the term of this patent is extended or adjusted under 35 U.S.C. 154(b) by 1558 days.

(21) Appl. No.: 09/842,604

(22) Filed: Apr. 26, 2001

Related U.S. Application Data

(60) Provisional application No. 60/249,303, filed on Nov. 16, 2000.

(51) Int. Cl.
*G06F 15/173* (2006.01)
*G06F 15/16* (2006.01)

(52) U.S. Cl. .................. 709/223; 709/231; 709/252

(58) Field of Classification Search ............... 709/204, 709/223, 229, 250, 226, 243, 230, 231, 246, 709/252; 370/254–256, 389, 390, 400, 260, 370/395.52; 725/96; 707/104.1
See application file for complete search history.

(56) References Cited

U.S. PATENT DOCUMENTS

| | | | | | |
|---|---|---|---|---|---|
| 5,835,723 | A | * | 11/1998 | Andrews et al. | 709/226 |
| 5,926,463 | A | * | 7/1999 | Ahearn et al. | 370/254 |
| 5,940,391 | A | * | 8/1999 | Malkin et al. | 370/390 |
| 5,951,649 | A | * | 9/1999 | Dobbins et al. | 709/238 |
| 6,011,782 | A | * | 1/2000 | DeSimone et al. | 370/260 |
| 6,055,561 | A | * | 4/2000 | Feldman et al. | 709/200 |
| 6,078,954 | A | * | 6/2000 | Lakey et al. | 709/223 |
| 6,138,144 | A | * | 10/2000 | DeSimone et al. | 709/204 |
| 6,141,347 | A | * | 10/2000 | Shaughnessy et al. | 370/390 |
| 6,215,766 | B1 | * | 4/2001 | Ammar et al. | 370/229 |
| 6,243,756 | B1 | * | 6/2001 | Whitmire et al. | 709/232 |
| 6,263,435 | B1 | * | 7/2001 | Dondeti et al. | 713/163 |
| 6,275,859 | B1 | * | 8/2001 | Wesley et al. | 709/229 |
| 6,331,983 | B1 | * | 12/2001 | Haggerty et al. | 370/400 |
| 6,421,706 | B1 | * | 7/2002 | McNeill et al. | 709/204 |
| 6,484,209 | B1 | * | 11/2002 | Momirov | 709/238 |
| 6,526,054 | B1 | * | 2/2003 | Li et al. | 370/390 |
| 6,538,997 | B1 | * | 3/2003 | Wang et al. | 370/241 |
| 6,556,544 | B1 | * | 4/2003 | Lee | 370/256 |
| 6,560,610 | B1 | * | 5/2003 | Eatherton et al. | 707/104.1 |
| 6,560,656 | B1 | * | 5/2003 | O'Sullivan et al. | 709/250 |
| 6,611,872 | B1 | * | 8/2003 | McCanne | 709/238 |
| 6,631,420 | B1 | * | 10/2003 | Li et al. | 709/242 |

(Continued)

OTHER PUBLICATIONS

Archibald C.R. Mott, "Bringing the MBONE Home: Experience with Internal", Sep. 18-22, 1995, USENIX Association in the Conference Proceddings of Ninth System Adminstration Conference, 12 pages.*

(Continued)

*Primary Examiner*—Douglas B Blair
(74) *Attorney, Agent, or Firm*—Anderson Gorecki & Manaras LLP

(57) ABSTRACT

A method and apparatus for producing a multicast tree in a network traces such tree based upon information retrieved from a multicast database that is protocol independent. More particularly, the network includes a plurality of network devices. A set of the plurality of network devices each includes the prior noted protocol independent multicast database. After the multicast database in each of the set of network devices is located, the multicast information in such databases is retrieved. After being retrieved, the multicast information is traced across the plurality of network devices to form the multicast tree.

22 Claims, 4 Drawing Sheets

U.S. PATENT DOCUMENTS

| | | | |
|---|---|---|---|
| 6,684,331 B1* | 1/2004 | Srivastava | 713/163 |
| 6,691,312 B1* | 2/2004 | Sen et al. | 725/96 |
| 6,732,182 B1* | 5/2004 | Beverly, IV | 709/230 |
| 6,785,245 B1* | 8/2004 | Lee et al. | 370/256 |
| 6,831,918 B1* | 12/2004 | Kavak | 370/395.52 |
| 6,839,348 B2* | 1/2005 | Tang et al. | 370/390 |
| 7,031,308 B2* | 4/2006 | Garcia-Luna-Aceves et al. | 370/390 |
| 7,042,870 B1* | 5/2006 | Albert et al. | 370/351 |
| 7,050,432 B1* | 5/2006 | Banavar et al. | 370/390 |
| 7,127,610 B1* | 10/2006 | Li et al. | 713/163 |
| 2002/0150094 A1* | 10/2002 | Cheng et al. | 370/389 |

OTHER PUBLICATIONS

Chen Niyue, "Protocol Independent Multicast-Sparse Mode (PIM-SM) Summaries", Nov. 29, 1998, Helsinki University of Technology, Computer Science Department, 3 pages.*

Mohammad Banikazemi, "IP Multicasting: Concepts, Algorithms, and Protocols", Feb. 7, 2000, Ohio Inversity, 19 pages.*

K. McCloghrie et al., "IPv4 Multicast Routing MIB", Oct. 2000, RFC 2932, 24 pages.*

McCloghrie, K., et al., "IPv4 Multicast Routing MIB", Networking Working Group, Request for Comments: 2932, Oct. 2000.

* cited by examiner

METHOD AND APPARATUS FOR PRODUCING A MULTICAST TREE

PRIORITY

This patent application claims priority from provisional U.S. patent application No. 60/249,303, entitled, "METHOD FOR DETERMINING MULTICAST DISTRIBUTION TREE," filed on Nov. 16, 2000 and naming Haixiang He as inventor, the disclosure of which is incorporated herein, in its entirety, by reference.

FIELD OF THE INVENTION

The invention relates generally to data transmission networks and, more particularly, the invention relates multicast transmissions within data transmission networks.

BACKGROUND OF THE INVENTION

Multicasting is a well known method of transmitting messages to selected groups of users across a network, such as the Internet. One simple example of multicasting involves transmitting an E-mail message to a plurality of users that each are on a mailing list. Video conferencing and teleconferencing also use multicasting principles and, consequently, often are referred to as "multiconferencing."

To enable users of a computer network to establish a multicast, the network devices (e.g., routers or personal computers) associated with each user of a multicast must be logical and/or physically connected. To that end, users in a multicast are logically connected through a structure known in the art as a "multicasting tree" (also referred to as a "multicast tree" or "tree structure"). Network management and multicasting applications use the multicast tree for a number of purposes, such as for routing data in the multicast and troubleshooting multicast problems.

A number of different multicasting protocols have been developed to implement multicasting within a network. Among others, those protocols include the Protocol Independent Multicast ("PIM") and the Distance Vector Multicast Routing protocol ("DVMRP"). Like other such protocols, both PIM and DVMRP each build a multicast tree in accordance with processes that are defined specifically for such protocols. Information about such trees is stored in databases that are accessible to those specific protocols only. Accordingly, by way of example, a database with tree information for PIM cannot be read by an application used for DVMRP.

There are times, however, when applications that are configured for use with one multicast protocol must read tree information stored in a multicast database that is configured in another format. In such case, the multicast database cannot be read and thus, no such tree information can be recovered.

SUMMARY OF THE INVENTION

In accordance with one aspect of the invention, a method and apparatus for producing a multicast tree in a network traces such tree based upon information retrieved from a multicast database that is protocol independent. More particularly, the network includes a plurality of network devices. A set of the plurality of network devices each includes the prior noted protocol independent multicast database. After the multicast database in each of the set of network devices is located, the multicast information in such databases is retrieved. After being retrieved, the multicast information is traced across the plurality of network devices to form the multicast tree.

In some embodiments, the multicast tree includes a root node, and the retrieved information is traced from the root node. In such case, the root node is one of the plurality of network devices. The network may implement the Internet Protocol, while each multicast database may be a management information base. In addition, the set of network devices may include a router, and the retrieved multicast information may be traced by an application incorporating the Simple Network Management Protocol ("SNMP"). The set of network devices may include no more than one of the plurality of network devices, or may include more than one of the plurality of network device.

Each of the set of network devices may include another type of database that is protocol independent. For example, the set of network devices may include a protocol independent unicast database having network information. The multicast tree may be produced also based upon the network information in each unicast database. In particular, after locating the unicast database within each of the set of network devices, the network data within such databases is retrieved. Once retrieved, the network data is traced to form the multicast tree.

Various embodiments of the invention are implemented as a computer program product having a computer usable medium with computer readable program code thereon. The computer readable code may be read and utilized by a computer system in accordance with conventional processes.

BRIEF DESCRIPTION OF THE DRAWINGS

The foregoing description of various embodiments of the invention should be appreciated more fully from the following further description thereof with reference to the accompanying drawings wherein.

DESCRIPTION OF ILLUSTRATIVE EMBODIMENTS

In illustrative embodiments of the invention, a multicast tree is formed based upon information retrieved from a multicast database that is protocol independent. By way of example, the database may be a management information base ("MIB"). Details are discussed below.

Figure 1:
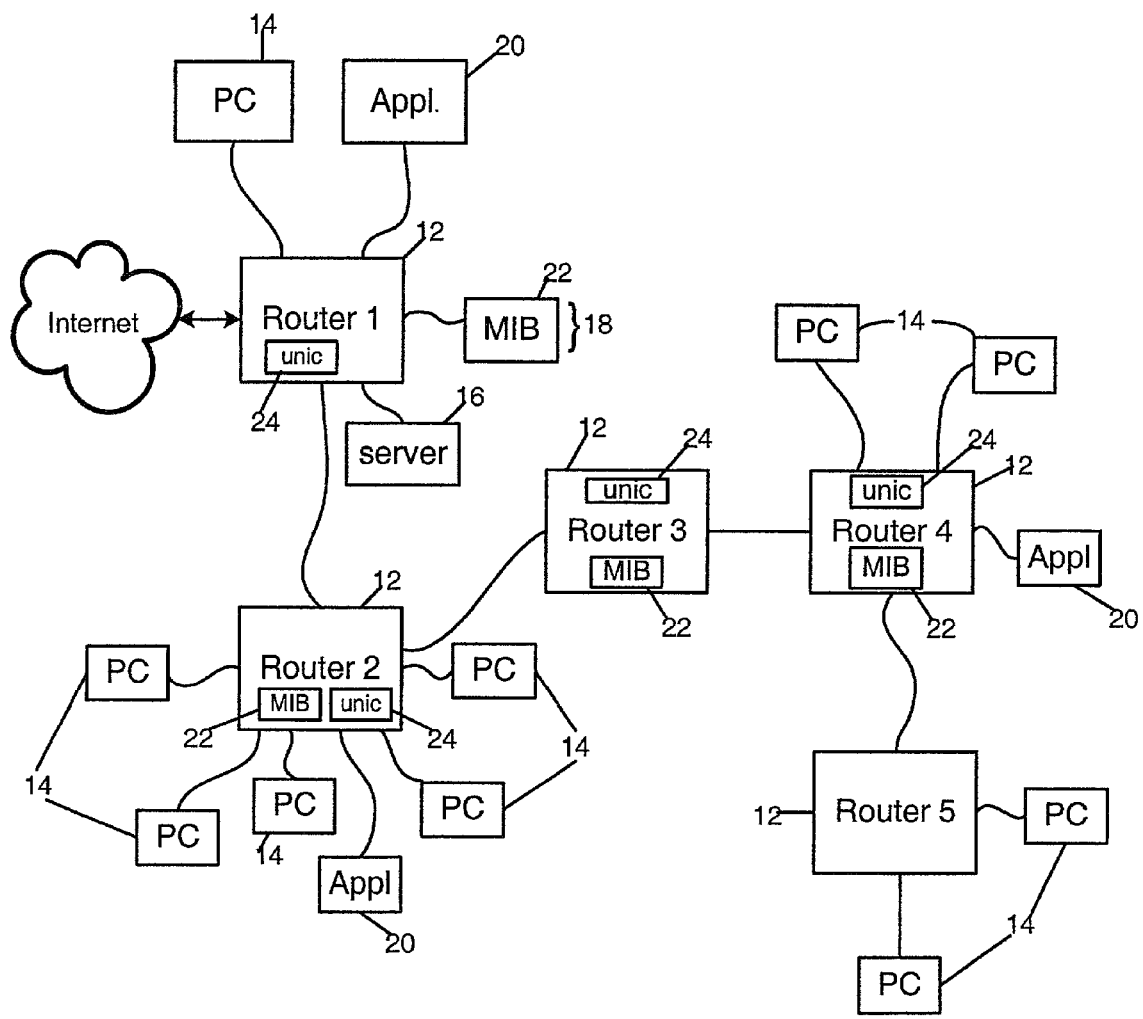
FIG. 1 schematically shows a well known network arrangement that may be used in connection with illustrative embodiments of the invention.

FIG. 1 schematically shows a network 10 that may be used with illustrative embodiments of the invention. The network 10 includes a plurality of network devices that communicate in accordance with various known data transmission protocols. For example, the network devices may communicate with remote network devices (not shown) across the Internet by using the Transport Control Protocol and the Internet Protocol ("TCP/IP"). Each shown network device may communicate with other shown network devices by using link layer protocols, such as the Frame Relay protocol.

The network 10 includes a plurality of network devices, including routers 12, personal computers 14, servers 16, external data storage devices 18, and network appliances 20

(e.g., an Internet telephone). Of course, other types of network devices not shown can also be included in the network 10, such as switches, hubs, multiplexers, etc.... Accordingly, details of the shown network 10 are intended to be exemplary and thus, various embodiments are not limited to the specific configuration of the shown network 10.

The network 10 includes five interconnected routers 12. Each router is referred to herein as one of router 1, router 2, router 3, router 4, or router 5. When discussed generally, however, the routers are identified herein by reference number "12," designated as and individually referred to as one of routers 1-5. The routers 12 may communicate and be managed by applications implementing any known routing protocol, such as the Simple Network Management Protocol ("SNMP") or the Routing Information Protocol ("RIP"). For example, router 1 may use SNMP to update the other routers in the network 10 when it detects a path change or other change in the network 10.

Routers 1, 2, 4, and 5 each are a part of separate local area networks ("LANs") that include the other types of network devices. In particular, the LAN of router 1 includes a connection to the Internet (e.g., via an Internet service provider), a personal computer 14, a network appliance 20, a server 16, and an external data storage device 18. Such LAN communicates directly with the LAN of router 2 via a direct link between the respective routers. In a similar manner, the LAN of router 4 is directly connected to the LAN of router 5 via a direct link between such two routers. Router 3 connects the LANs of router 2 and router 4.

Routers 1-4 each have an associated multicast database that is protocol independent. Such multicast database includes multicast data relating to one of the four routers. More particularly, for a given router, each such database includes multicast data, such as the group multicast ID of one or more multicasts, the IP address of parent and child nodes to the given router for the one or more multicasts, and the interfaces of such parent and child nodes. Accordingly, the multicast database on any node does not include enough information to build the multicast tree.

The multicast database may be stored on each node as a MIB. Each such MIB on any given node is shown and referred to herein as the "standard MIB 22." Router 1 thus has access to its standard MIB 22 via a coupled external storage device 18 (i.e., a disk array), while routers 2-4 each have internal memory for storing their standard MIBs 22. As discussed in greater detail below, the standard MIB 22 on each node in a multicast is used to form a multicast tree. It also should be noted that since router 5 does not include its own standard MIB 22, it cannot implement illustrative embodiments of the invention.

In addition to the standard MIB 22, each of routers 1-4 also includes a unicast database 24 normally used for routing data packets across the network 10. As known by those in the art, the unicast database 24 also is protocol independent. Accordingly, the routers can use conventionally known program code to access their respective unicast databases 24. In some embodiments, such conventionally known program code also can be used to access the standard MIB 22.

A subset of the network devices in the network 10 together form and maintain a multicast in accordance with conventional processes. For example, such network devices may form and maintain a multicast with one of several known multicast protocols, such as the Protocol Independent Multicast ("PIM") or the Distance Vector Multicast Routing protocol ("DVMRP"). Of course, any known multicast protocol may be used and thus, embodiments of the invention are not limited to the discussed protocols.

The standard MIB 22 on each node preferably is formed and maintained as the multicast is formed and maintained. In addition, as noted above, the standard MIBs 22 on each node may include multicast data for a plurality of multicasts and thus, be used to trace a plurality of multicast trees. The standard MIB 22 may be similar to that described in Request For Comment number 2932 ("RFC 2932"), which is published by the Internet Engineering Task Force. The disclosure of RFC 2932 is incorporated herein, in its entirety, by reference. The purpose of the standard MIB 22 described in RFC 2932, as understood by the inventor, is to store state information and not to build the multicast tree. It also should be noted that illustrative embodiments may be directed to other types of multicast databases that are protocol independent. Accordingly, the standard MIB 22 is discussed herein as but one exemplary type of database and thus, not intended to limit the scope of various embodiments of the invention.

More particularly, each standard MIB 22 includes managed objects for managing IP multicast routing for IPv4. In illustrative embodiments, the standard MIB 22 includes one scalar and five tables. The tables include:

1. Multicast Route Table having multicast routing information for IP datagrams sent by particular sources to the IP multicast groups known to a router.

2. IP Multicast Routing Next Hop Table having information on the next hops of the routing of IP multicast datagrams. Each entry is one of a list of next hops on outgoing interfaces for particular sources sending to a particular multicast group address.

3. IP Multicast Routing Interface Table having multicast routing information specific to interfaces.

4. IP Multicast Scope Boundary Table having the boundaries configured for multicast scopes. For additional details on this table, see Meyer, D., "Administratively Scoped IP Multicast," BCP 23, RFC 2365, July 1998, the disclosure of which is incorporated herein, in its entirety, by reference.

5. IP Multicast Scope Name Table having human readable names of multicast scope.

As noted above, the standard MIB 22 can be used by a network management application, such as one implementing SNMP, to build a multicast tree representing the multicast. To that end, FIG. 2 generally shows an illustrative process of forming the multicast tree for a given multicast. The process begins at step 200, in which the root node of the multicast is located. The standard MIB 22 for that node then is accessed to determine the multicast data relating to such root node (step 202). Among other things, such multicast data can include the IP addresses of the next hop(s) children nodes, interfaces of the such child nodes, etc. . . . Information relating to the root node then is stored in a tree data structure that is formed to ultimately contain the entire tree (step 204). Such information may include the IP address of the root node, and pointers child nodes. The data structure may be stored in a memory device that is resident on the network device executing the SNMP management program.

After the multicast data is stored in the tree data structure, it is determined at step 206 if additional nodes are in the multicast. If not, then the entire multicast has been traced, thus completely forming the multicast tree. Since at this point the root node is being examined, then other nodes do exist. Accordingly, the process continues to step 208, in which the standard MIB 22 in the first child mode of the root node is queried. The process then loops back to step 202, in which multicast data is retrieved.

This process repeats for all child nodes of the root node. After the last child node for the root node is processed, then the process repeats for each child node of the root node. In such case, the child nodes to each child of the root node (i.e., the grandchild nodes of the root node) are ascertained and stored in the tree data structure. This iterative process continues until all nodes and all branches in the multicast have been traced, thus producing the multicast tree within the tree data structure. The final resulting tree data structure may be used for a plurality of reasons, such as by a network administrator or application program for troubleshooting purposes.

Below is pseudo code for an exemplary implementation of illustrative embodiments that have been implemented using JAVA. As explicitly noted below with reference to FIG. 4, the multicast tree is formed by indexing to the IP address of the source of the multicast traffic, and the multicast group address. The pseudo code is as follows:

```
Create a queue of tree nodes;
Add the root node into queue;
While (Queue is not empty) {
    Get and delete the first tree node element TN from queue;
    Query the ipMRouteNextHopEntry table of the multicast
    routing mib Mcast MIB using SNMP with the SNMP
    target set to TN;
    Get all the outgoing network interface indexes with the
    conditions that the interfaces are used to forward multicast
    traffic from source IP address S and destination group
    address G;
    For each of the outgoing interface index OI shown above {
        Query the topology information with the tree node
        and the interface index to get all the neighbors of
        this interface;
        For each of the neighbors NB {
            If the neighbor is a host receiver, then add it
            as a child node of TN;
            If the neighbor is a router, then {
                Query
                ipMRouteEntry.ipMRouteInIfIndex
                of Mcast MIB using SNMP with
                the SNMP target set to the neighbor;
                Get the incoming network interface
                index II with the condition that
                ipMRouterEntry's instance ID
                contains both source IP address S
                and destination group address G;
                If there is a link that contains TN,
                OI, NB, II, then {
                    Add the neighbor as a child node of
                    TN;
                    Add the neighbor into the queue;
                }
            }
        }
    }
}
```

Figure 2:
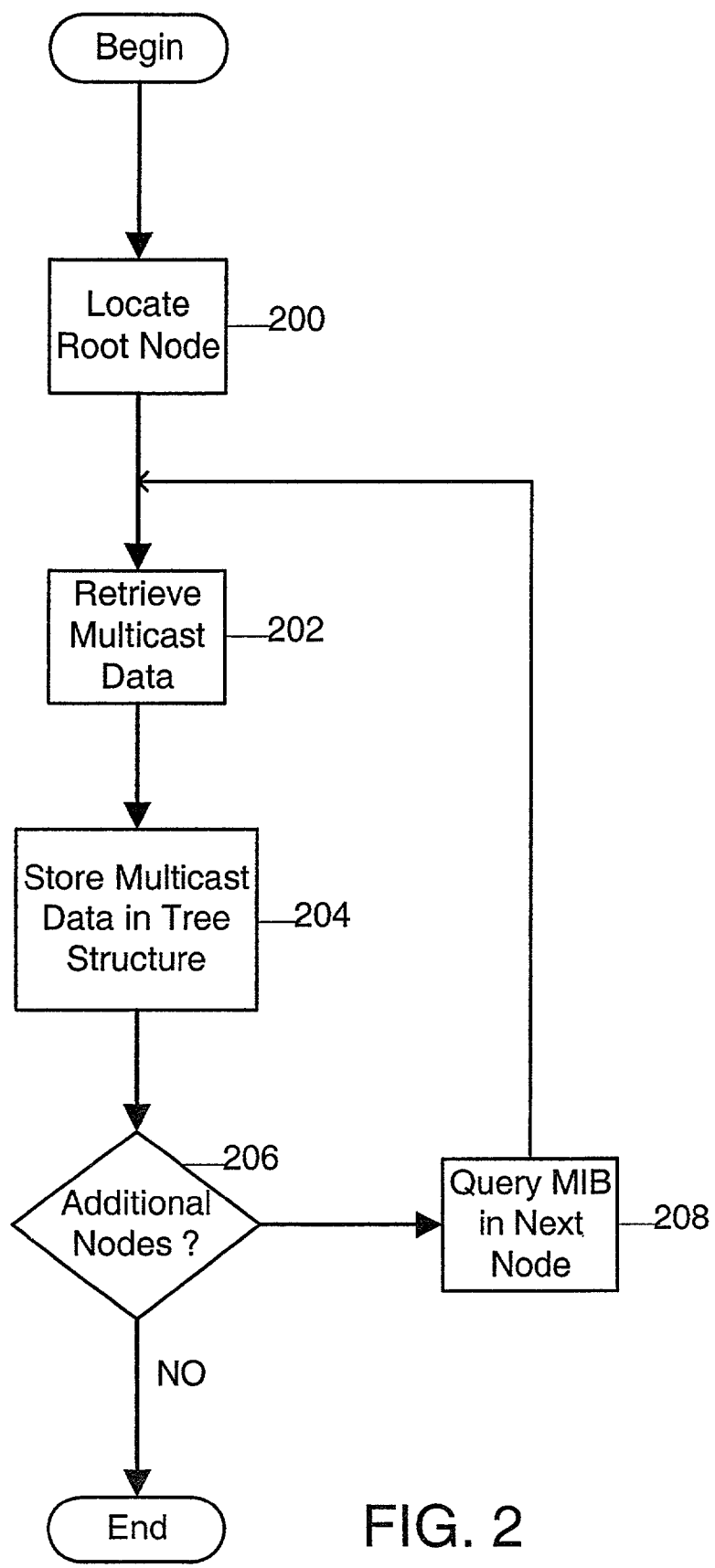
FIG. 2 generally shows a process of producing a multicast tree in accordance with illustrative embodiments of the invention.
Figure 3:
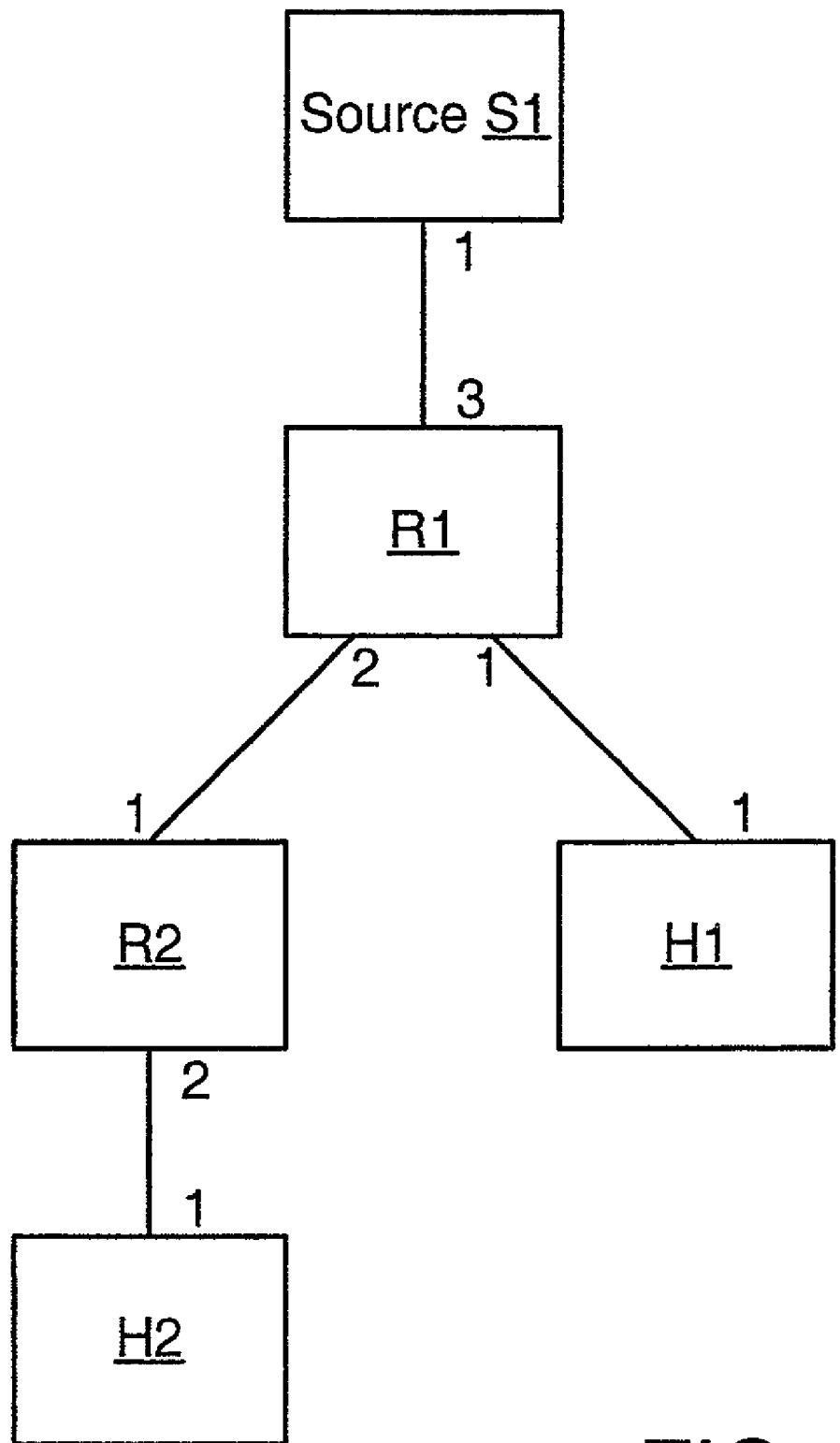
FIG. 3 schematically shows nodes in a simplified multicast for the purpose of illustrating the process in FIG. 2.

FIG. 3 shows a simplified group of network devices implementing a multicast. This group of network devices will be used by way of example to illustrate one implementation of the pseudo code and FIG. 2 in accordance with various embodiments of the invention. The multicast includes a source network device (e.g., a personal computer 14), a first router designated as R1, a second router designated as R2, a first host (e.g., a personal computer 14) and a second host (e.g., a personal computer 14). The network devices in this network may be a part of the network 10 shown in FIG. 1, or any other network that implements illustrative embodiments. Each network device in the group has one or more interfaces for connecting with a neighboring network device. The interfaces are designated in FIG. 3 by the numbers 1, 2, and 3.

Figure 4:
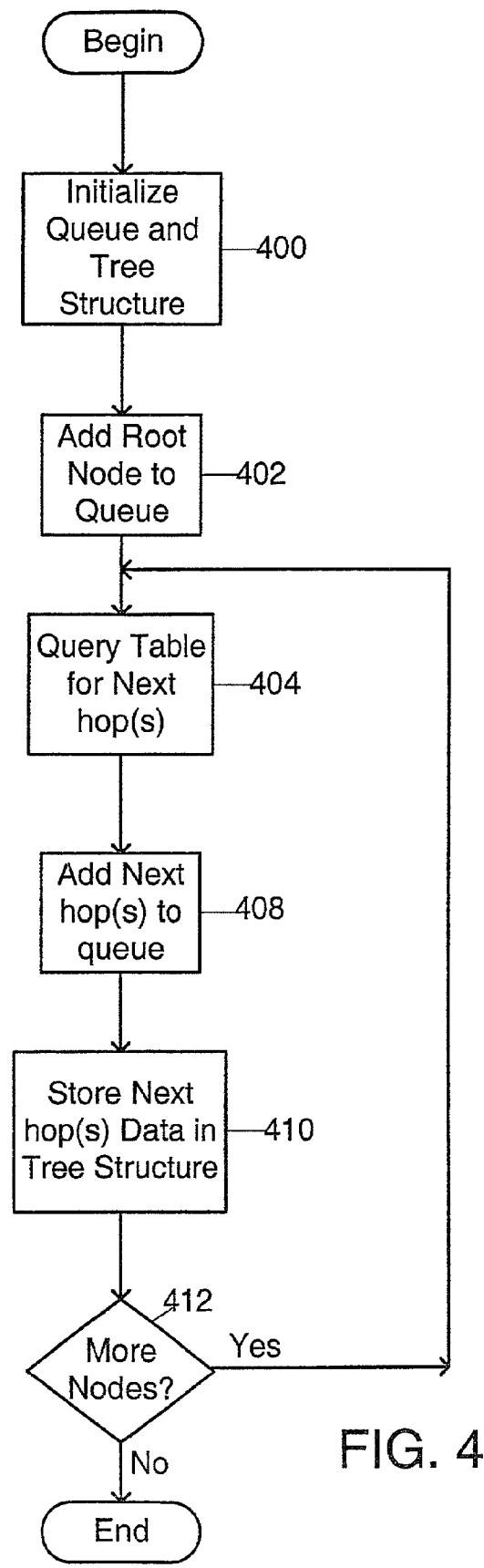
FIG. 4 shows a more detailed example of forming a multicast tree in accordance with illustrative embodiments of the invention.

FIG. 4 shows a specific process using SNMP for forming the multicast tree for the group of network devices shown in FIG. 3. In a manner similar to the process shown in FIG. 2, this process traces the multicast tree from node to node in the multicast. When discussing this process, the source IP address is 10.100.50.2, and the multicast destination group address is 224.3.3.3. Accordingly, as demonstrated below, these are the two above noted parameters that are used to form the multicast tree.

The process begins at step 400, in which a node queue and a tree data structure (discussed above) are formed. As discussed below, the queue stores list of IP addresses of each node in the multicast as they is learned. This list then is used by the process to step through the entire multicast tree to ensure that no nodes are omitted from the final tree structure. The tree data structure, as noted with reference to FIG. 2, is used to build the overall multicast tree structure. Shortly after initialization, the source S1 and its router R1 are added to the tree data structure.

Once the queue and tree structure are initialized, the process continues to step 402, in which the root node (router R1) is added to the queue. A pointer in the queue then points to router R1, which causes the management application to access the MIB data in the router R1 to determine additional information relating to the multicast tree (step 404). Specifically, the IP Multicast Next Hop table of the router R1 is accessed to determine the next hop in the multicast from router R1. This table is referred to in the pseudo code as the ipMRouteNextHopEntry" table. The source address (10.100.50.2) and the multicast group destination address (224.3.3.3) are used to determine the interfaces of the router R1 that have connected network devices in the multicast. Continuing with the exemplary network in FIG. 3, it is determined that interface 1 of router R1 is connected to one such network device, while interface number 2 of router R1 is connected to another such network device.

The process then continues to step 408, in which all child nodes of the router R1 are added to the queue. Accordingly, the IP addresses of the router R2 and host H1 are added to the queue. Moreover, the IP addresses of the child nodes are added to the tree data structure with pointers indicating that such nodes are child nodes of router R1. In some embodiments, interface information also is added to the tree data structure.

The process then continues to step 412, in which it is determined if more nodes are in the multicast tree. To that end, the pointer in the queue is incremented to point to the next node, which is either one of router R2 or host H1. In such case, the standard MIB 22 in such next node is examined to determine next hop information to it (step 404). This iterative process thus continues until the entire multicast tree is formed in the tree data structure. This may be determined when a null or other value is pointed to in the queue at step 412.

In alternative embodiments, in addition to the data in the standard MIB 22, data from the unicast database 24 also may be used to build the multicast tree. For example, both the standard MIB 22 and the unicast database 24 may be queried to ascertain multicast tree information. Of course, in this embodiment, the multicast tree still is formed without accessing protocol specific multicast databases.

Accordingly, the entire multicast tree can be traced and thus, fully formed, by accessing the standard MIB 22. Since it is not dependent on any specific multicast routing protocol, the process of forming the multicast tree can be used by network systems that support different multicast routing protocols.

Some embodiments of the invention may be implemented at least in part in any conventional computer programming language comprising computer program code. For example, preferred embodiments may be implemented in a procedural programming language (e.g., "C") or an object oriented programming language (e.g., "++"). Alternative embodiments of the invention may be implemented, at least in part, as preprogrammed hardware elements (e.g., application specific integrated circuits, FPGAs, and digital signal processors), analog circuit elements, or other related components.

In other embodiments, the disclosed apparatus and method may be implemented as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

Although various exemplary embodiments of the invention have been disclosed, it should be apparent to those skilled in the art that various changes and modifications can be made that will achieve some of the advantages of the invention without departing from the true scope of the invention. These and other obvious modifications are intended to be covered by the appended claims.

What is claimed is:

1. A method of producing a multicast tree by a network management application configured to use a first multicast routing protocol, from existing protocol independent multicast routing information in a network, at least some of the protocol independent multicast routing information having been created from multicast information associated with an application configured to use a second multicast routing protocol, the network including a plurality of network devices including at least a plurality of routers that are members of a multicast associated with the multicast tree, a set of the routers each including a management information base containing protocol independent multicast routing information, the method comprising the steps of:

accessing, by the network management application, a plurality of the management information bases containing the protocol independent multicast databases;

retrieving, by the network management application, at least a portion of the existing protocol independent multicast routing information from each accessed management information bases; and tracing, by the network management application, the retrieved existing protocol independent multicast routing information to form a representation of the multicast tree in the network management application.

2. The method as defined by claim 1, wherein the multicast includes a root node, the retrieved existing protocol independent multicast routing information being traced from the root node, the root node being one of the plurality of routers.

3. The method as defined by claim 1, wherein the first multicast protocol is Distance Vector Multicast Routing Protocol (DVMRP), and wherein the second multicast protocol is Protocol Independent Multicast (PIM).

4. The method as defined by claim 1, wherein each of the set of routers includes a protocol independent unicast database having network information, the method further including:

accessing, by the network management application, a plurality of the protocol independent unicast databases;

retrieving by the network management application, at least a portion of the network information from each accessed protocol independent unicast database; and using, by the network management application, the retrieved network information to form the multicast tree.

5. The method as defined by claim 1, wherein at least one of the plurality of network devices includes a protocol dependent multicast routing information database, the multicast tree being formed free from any data retrieved from the protocol dependent multicast routing information database.

6. The method as defined by claim 1, wherein the retrieved protocol independent multicast information is traced by the network management application using Simple Network Management Protocol (SNMP).

7. The method as defined by claim 1 wherein the set of routers includes only one of the plurality of network devices.

8. The method as defined by claim 1, wherein the set of routers includes a first router and a second router, each management information base containing a set of protocol independent multicast data, the set of protocol independent multicast data being different in the management information base in the first router than the set of protocol independent multicast data in the management information base in the second router.

9. An apparatus for producing a multicast tree for a network management application configured to use a first multicast protocol from existing protocol independent multicast information in a network that may have been created using a second multicast protocol, the network including a plurality of network devices including at least a plurality of routers that are members of the multicast, a set of the routers each including a management information base containing protocol independent multicast information, the apparatus comprising a computer-readable medium containing instructions for controlling at least one processor to implement;

a multicast processing module, the multicast processing module being capable of accessing the protocol independent multicast information within each of the set of the management information bases of each of the routers, the multicast processing module also being capable of retrieving the existing protocol independent multicast information from each accessed management information base; and a tracing module operably coupled with the multicast processing module, the tracing module being capable of tracing the retrieved existing protocol independent multicast information across the plurality of routers to form the representation of the multicast tree according to the first multicast protocol.

10. The apparatus as defined by claim 9, wherein the multicast includes a root node, the tracing module being capable of tracing the retrieved protocol independent multicast information from the root node, the root node being one of the plurality of network devices.

11. The apparatus as defined by claim 9, wherein the network implements the Internet Protocol, wherein the first multicast protocol is Protocol Independent Multicast (PIM), and wherein the second multicast protocol is Distance Vector Multicast Routing Protocol (DVMRP).

12. The apparatus as defined by claim 9, wherein each of the set of routers includes a protocol independent unicast database having network information, and wherein the computer-readable medium further contains instructions for controlling the at least one processor to implement a unicast database processing module configured to access a plurality of the protocol independent unicast databases within each of the set of routers, the unicast database processing module also being configured to retrieve at least a portion of the network information from each accessed protocol independent unicast database, the retrieved network information being used to form the multicast tree.

13. The apparatus as defined by claim 9 wherein at least one of the plurality of network devices includes a protocol dependent multicast routing information database, the multicast tree being formed free from any data retrieved from the protocol dependent multicast routing information database.

14. The apparatus as defined by claim 9, wherein the retrieved protocol independent multicast information is traced by the network management application using Simple Network Management Protocol (SNMP).

15. The apparatus as defined by claim 9 wherein the set of network devices includes only one of the plurality of routers.

16. A computer program product for use on a computer system for producing a multicast tree for a network management application configured to use a first multicast protocol from existing protocol independent multicast information in a network, at least some of the protocol independent multicast information having been created from protocol specific multicast information associated with an application configured to use a second multicast protocol, the network including a plurality of network devices including at least a plurality of routers that are members of a multicast associated with the multicast tree, a set of the routers each including a Management Information Base containing the protocol independent multicast information, the computer program product comprising a computer usable medium having computer readable program code thereon, the computer readable program code comprising:

program code for accessing a plurality of the MIBs;
program code for retrieving at least a portion of the existing protocol independent multicast information from each accessed MIB; and
program code for tracing the retrieved existing protocol independent multicast information to form a representation of the multicast tree in the network management application.

17. The computer program product as defined by claim 16, wherein the multicast includes a root node, and wherein the program code for tracing the retrieved protocol independent multicast information is configured to trace the retrieved existing protocol independent multicast information from the root node, the root node being one of the plurality of routers.

18. The computer program product as defined by claim 16, wherein the network implements the Internet Protocol, wherein the first multicast protocol is Distance Vector Multicast Routing Protocol (DVMRP), and wherein the second multicast protocol is Protocol Independent Multicast (PIM).

19. The computer program product as defined by claim 16, wherein each of the set of routers includes a protocol independent unicast routing information database having unicast routing information, the computer program code further including:

program code for accessing a plurality of the protocol independent unicast routing information databases;
program code for retrieving at least a portion of the unicast routing information from each accessed protocol independent unicast routing information database; and
program code for using the retrieved unicast routing information to form the multicast tree.

20. The computer program product as defined by claim 16 wherein at least one of the plurality of network devices includes a protocol dependent multicast routing information database, the multicast tree being formed free from any data retrieved from the protocol dependent multicast routing information database.

21. The computer program product as defined by claim 16 wherein the program code for tracing uses Simple Network Management Protocol (SNMP).

22. The computer program product as defined by claim 16 wherein the set of routers includes only one of the plurality of network devices.

* * * * *